June 11, 1929. J. R. CALDWELL 1,717,185
GLARE PROTECTOR
Filed Dec. 29, 1927
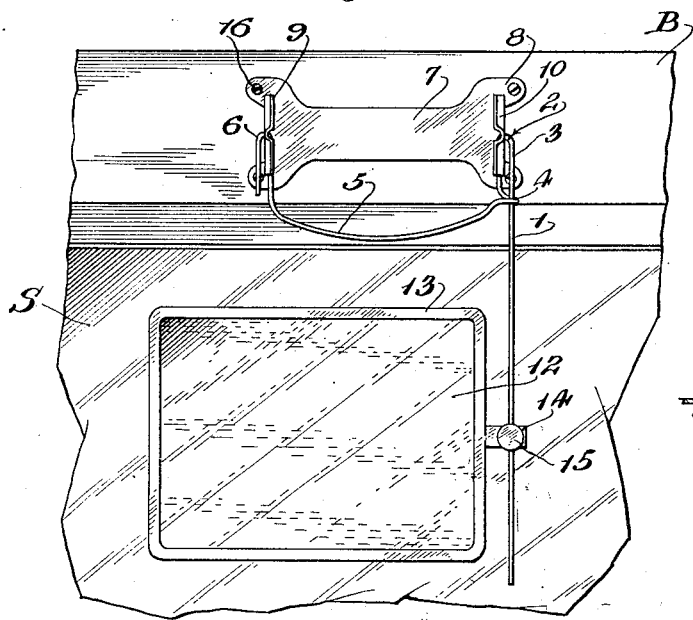
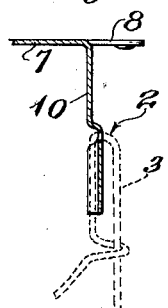
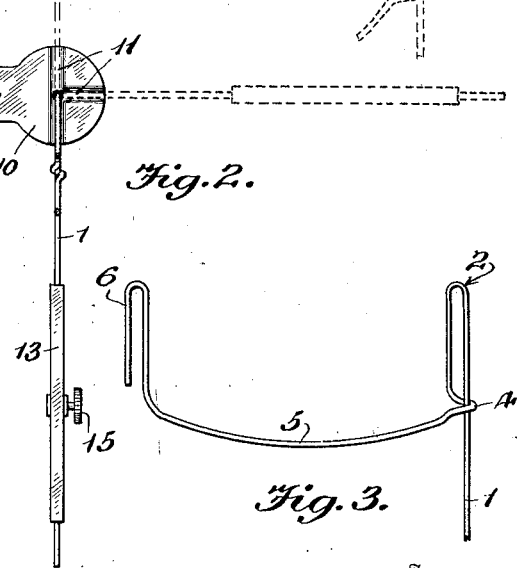
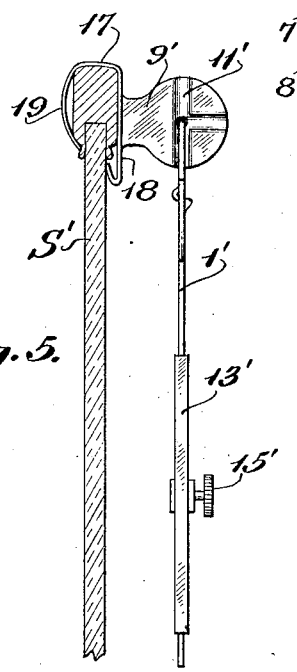
Inventor
James R. Caldwell
By William C. Linton
Attorney Patented June 11, 1929.

1,717,185

UNITED STATES PATENT OFFICE.

JAMES RAY CALDWELL, OF BAY SPRINGS, MISSISSIPPI.

GLARE PROTECTOR.

Application filed December 29, 1927. Serial No. 243,390.

This invention relates to improvements in glare protectors or shields for self propelled vehicles, either land or marine, and particularly for automobiles, having for one of its salient objects to provide a simple and inexpensive article of manufacture capable of convenient and ready attachment to or adjacent an automobile windshield in a manner to permit its movement or adjustment into or partially into the line of vision of the vehicle operator whereby to protect and shield his eyes from road, sun or headlight glare, the latter being caused by brilliant and sometimes improperly focused headlights of approaching vehicles, and consequently, to prevent the well recognized and appreciated incident inconvenience and danger thereof.

It is another of the objects of this invention to provide the device of the character mentioned that when no need for its usage exists may be instantly and effectually moved to an inoperative and out-of-the-way position without liability of undesired or accidental return to an operative position and thus, will not interfere with normal driving conditions.

The invention may be also stated to include amongst its principal desideratums, the provision of a glare protector wherein the elements of construction thereof are capable of being made at minimum production costs, consideration being given in that making to the provision of a device of rugged wearing qualities and durability and which, due to its novel construction will reduce the number of working parts.

Other objects of the invention will be in part obvious and in part pointed out hereinafter.

In order that the invention and its mode of operation may be readily understood by those skilled in the art, I have in the accompanying illustrative drawings and in the detailed following description based thereupon, set out one possible embodiment of the invention.

In these drawings:

Figure 1 is a front elevation of the invention showing it applied or installed within a closed type body of automobile, Figure 2 is a transverse section through the bracket mounting of the glare protector showing the manner in which the supporting arm together with the glare protector proper are secured in adjusted position, Figure 3 is a fragmentary detail in elevation showing the manner in which the supporting arm is formed or shaped, Figure 4 is a fragmentary detail in horizontal section through one of the supporting brackets for the supporting arm showing the engagement of one of the pivotal mounting members therein, and Figure 5 is an end elevation of a slightly modified form of bracket mounting for the glare protector.

Having more particular reference to the drawings, in connection with which like reference characters will designate corresponding parts throughout, the improved glare protector may be stated to comprise a supporting arm consisting of a single piece or length of spring material such as wire or the like possessing the necessary degree of spring yet a sufficient amount of rigidity to lend stability to the construction, said supporting arm being formed with a straight elongated end shank portion designated by the numeral 1 while the opposite portion thereof is disposed laterally by bending it at substantially right angles as is indicated by the numeral 2, said opposite portion being then bent or fastened to constitute a substantially U-shaped pivotal mounting member 3, inverted in its disposition, whereupon the remaining portion of said opposite portion of the supporting arm is bent laterally and around a part of the elongated shank 1 as is indicated by the numeral 4 and is then extended laterally from the shank and curved upon itself in the manner indicated by the numeral 5, the free end portion of this intermediate and curved part being formed with an upwardly or substantially right angularly disposed extension bent into substantially inverted U-shaped formation to constitute a second pivotal mounting member 6, said second pivotal mounting member being arranged or positioned in a manner complemental to that of the pivotal mounting member 3 and in spaced relation thereto as is shown in the Figures 1 and 3.

That an effectual mounting may be provided the supporting arm hereinbefore described, I may provide a type of bracket such as indicated in its entirety by the numeral 7, stamping or striking said bracket from a single piece of sheet metal or other suitable material possessing the necessary rigidity and stability; forming anchoring or securing ears 8 upon the extremities of the base seat of said members while brackets proper, designated by the numerals 9 and 10 are struck outwardly at substantially right angles from said base portion in the manner shown in the Figures 1 and 4. These members 9 and 10 have circular end pieces or extremities formed thereupon and in the adjacent faces of each thereof I stamp or strike a plurality of relatively spaced and radially disposed channels or ways designated generally by the numeral 11; also forming openings concentrically of each of the circular extremities, for a purpose which will be presently apparent.

In mounting the supporting arm upon the bracket 7, the laterally disposed portion thereof is passed through the bearing openings formed in the concentric portions of the circular extremities of the brackets proper 9 and 10 and said portion of the supporting arm is bent or fashioned in the manner hereinbefore explained; the basal portions of each of the pivotal mounting members 3 and 6 being engaged or received through the concentrically arranged bearing openings in said brackets proper 9 and 10 as is illustrated in the figures of the accompanying drawing, hence affording said supporting arm with a pivotal mounting.

With the pivotal mounting of the supporting arm in the brackets proper 9 and 10, it is desirable that the relatively inner sides of each of the pivotal mounting members 3 and 6 shall have yieldable or spring like engagement with the adjacent faces of said brackets and to effect or render this engagement positive, the relative spacing of the pivotal mounting members 3 and 6 is effected by bending or flexing the curved intermediate portion 5 to such an extent as to either increase or decrease the distance between the pivotal mounting members and thereby bring about a yieldable or spring like engagement of the same with the inner faces of the bracket proper and consequently thereupon, insure the engagement of the inner sides of the pivotal mounting members with the radially disposed channels 11 with swinging movement of the supporting arms into appropriate positions. Obviously, with engagement of the inner sides of the U-shaped pivotal mounting members 3 and 6 in the channels 11 of the brackets proper 9 and 10, said supporting arm will be releasably or removably secured in a substantially fixedly adjusted position and in this way, the retention of the square shank portion 1 of said supporting arm in an inoperative or operative position will be assured and further, any objectionable swinging or vibratory movement of the elongated shank 1 will be prevented.

A glare shield consisting of a sheet of translucent material indicated by the numeral 12 and of suitable size, shape or configuration is received or carried within a frame 13 provided with a supporting arm 14 which arm is formed with an opening adapted to receive the straight elongated shank 1 therethrough in the manner indicated in the Figure 1 whereupon an adjusting or locking screw 15 is turned into engagement with the arm 14 and into binding engagement with an adjacent portion of said shank 1 that the glare protector and the frame 13 carrying it may be adjusted to different positions throughout the length of the shank 1.

To install my improved glare protector in an automobile of the closed body type, the bracket 7 is preferably arranged adjacent an appropriate portion of the roof supporting bar or strip adjacent and directly above the automobile windshield S, such bar being indicated for convenience herein by the reference character B. With proper location of the bracket 7, screws or other suitable fastening devices 16 are passed through the apertured anchoring ears 8 into engagement with the bar B thereby effecting the desired affixation.

Where it is desired to use my improved glare protector in connection with an open body type of automobile, it will be appreciated that a slightly different type of bracket mounting must be provided for the supporting arm and to this end, I propose that modified form of bracket mounting illustrated in the Figure 5, wherein brackets proper 9', corresponding to the brackets 9 and 10 in the preceding embodiment, are provided, these brackets being carried upon a strip like supporting base or body 17 constructed of spring metal; the forward or normally inner side thereof being substantially straight throughout its width as indicated by the numeral 18 whereas the outer or remaining side is formed to constitute a curved frictional engagement finger 19, thus presenting a substantially U-shaped attaching bracket or clip which may be engaged over the upper portion of the windshield frame S', as is shown in the same Figure 5 and when so engaged, will provide an effectual support for the brackets proper 9'.

These brackets 9' are too formed with relatively spaced radially disposed channels 11' and concentrically arranged bearing openings through which the pivotal mounting members of the glare protector supporting arm 1' are adapted to be engaged, the straight elongated shank portion of said supporting arm being provided with a glare protector carrying frame 13' corresponding to the glare protector described in the preceding embodiment and adapted to be secured in relatively adjusted position upon the straight elongated shank through the medium of an adjusting or locking set screw 15'.

In using my improved glare protector, it will be understood that the inoperative position of the protector such as is illustrated in the Figure 1 will be represented when the straight elongated shank 1 and the glare protector 14 are in relative parallelism to the automobile body roof; said supporting arm being retained in this position by means of the spring like engagement of the pivotal mounting members 3 and 6 with the adjacent channels 11' formed in the brackets proper 9 and 10. To swing the glare protector into an operative position, it is only necessary to engage the free end of the shank 1 or the curved intermediate portion 5 and to pull the same downwardly, thereby disengaging the pivotal mounting members from the aforesaid channels 11 and permitting them to then become engaged with the lowermost channels 11 in the fashion as is shown in the Figure 2. With the positioning of the glare protector 12 in that position as is shown in the Figure 2, it will be understood that the translucent body will be positioned in the line of vision of the vehicle operator and will have been so adjusted as to shield his eyes from road, sun or headlight glare. If desired, the positioning of the glare shield may be varied or adjusted merely by changing its position upon the straight shank 1 through the supporting arm 14 and the locking or adjusting set screw 15.

The operation of that form of the invention disclosed in the Figure 5 will, of course, correspond to the operation of the first described embodiment.

Should with a prolonged period of usage, the spring contact of the pivotal mounting members 3 and 6 with the brackets proper 9 and 10 and 9' be lessened or should this contact be too great, it will be readily understood that the same may be properly regulated or adjusted by bending the curved intermediate portion 5 of the supporting arm in a direction to either spread or contract the opposite end portions thereof and in so doing, it will be readily seen that the pivotal mounting members upon the extremities thereof will be varied in their relative spacing. Consequently upon this, said pivotal mounting members may be caused to exert considerable stress upon the rigid brackets proper 9 and 10 and 9' or if desired, a lesser degree of stress may be imparted thereto, such as conditions or preference may dictate, this being controlled solely by the positive manner in which the pivotal mounting members will be engaged in the channels 11 and 11' of the brackets proper and will function to retain the glare protector supporting arm in any one of its adjusted positions.

Manifestly, the construction shown is capable of considerable modification and such modification as is within the scope of my claims, I consider within the spirit of my invention.

I claim:

1. A glare protector comprising a supporting arm formed of a single piece of spring material having a straight shank end portion, the opposite portion being disposed laterally therefrom and formed into relatively spaced pivotal mounting members having relatively straight parallel opposite sides, and the intermediate portion of said opposite end portion being capable of bending to increase or decrease the spacing between said members, rigid relatively fixed brackets receiving the pivotal mounting members therein, each of said brackets having differently positioned radial channels formed in the faces thereof adapted to receive certain of the sides of the members therein, and a glare shield carrying frame secured to said shank portion.

2. A glare protector comprising a supporting arm formed of a single piece of spring material having a straight shank end portion, the opposite portion being disposed laterally therefrom and formed into relatively spaced pivotal mounting members having relatively straight parallel opposite sides, and that portion of said opposite portion being capable of adjustment to increase or decrease the spacing between said members, rigid fixed brackets receiving the pivotal members therein, each of said brackets having differently positioned radial channels formed in portions of the same adapted to receive certain of the sides of said members therein, a glare shield carrying frame received upon said straight shank portion, and means for adjustably fixing said frame to the shank portion.

3. A glare protector comprising a supporting arm formed of a single piece of spring material having a straight shank end portion, the opposite portion being disposed laterally therefrom and formed into relatively spaced pivotal mounting members of substantially U-shape, and the intermediate portion of said opposite portion being capable of bending to increase or decrease the spacing between the pivotal mounting members, brackets receiving the pivotal mounting member therein, means on said brackets for receiving portions of the pivotal mounting members therein and retaining the same in differently adjusted positions, and a glare shield carrying frame adjustably carried upon said shank portion.

4. A glare protector comprising a supporting arm formed of a single length of spring material having a straight shank end portion, the opposite portion being disposed laterally therefrom and bent upon itself to constitute relatively spaced U-shaped pivotal mounting members, that portion of said opposite portion between the pivotal mounting members being curved upon itself and capable of bending to increase or decrease the spacing between said members, rigid brackets receiving the pivotal mounting members therein, means on each of said brackets for temporarily receiving and retaining said pivotal mounting members and the straight shank portion in differently adjusted positions, and a glare shield carrying frame adjustable throughout the length of said straight shank portion.

5. A glare protector comprising a bracket including bracket members having radially related channels, a one-piece wire support providing spaced U-shaped pivots mounted in said members and an intermediate bowed portion adapted to yieldably hold side portions of the pivots selectively in said channels, and a shield connected to said support.

6. A glare protector comprising a bracket having oppositely disposed bracket members each provided with a group of radially disposed channels, a support formed from a single length of wire to provide U-shaped members pivotally mounted in the bracket members and having certain limbs adjustably related with said channels, and an intermediate bowed portion connecting said limbs for yieldably associating the same with said channels, and a shield connected to said support.

7. A glare protector comprising a bracket having spaced bracket members struck therefrom, each provided with a group of radially disposed channels, a support formed from a single length of wire bent to provide spaced U-shaped members pivotally mounted in said bracket members to be adjustably related with said grooves, an intermediate bowed portion associated with the U-shaped members to yieldably hold the same related with the channels in said bracket members, and a shank portion, and a shield mounted on said shank portion.

8. In combination, a bracket, a shield and a support between the shield and bracket consisting of a single length of wire bent to provide a shank upon which the shield is mounted, a pair of members pivotally connected to the bracket, and an intermediate bowed portion yieldably creating a binding engagement between the pivoted members and the bracket.

In witness whereof I have hereunto set my hand.

JAMES RAY CALDWELL.